Jan. 27, 1970     D. L. GRAHAM     3,491,916

POLYURETHANE AEROSOLS

Filed April 18, 1966

INVENTOR.
Donald L. Graham
BY
Griswold & Burdick
ATTORNEYS

United States Patent Office

3,491,916
Patented Jan. 27, 1970

3,491,916
POLYURETHANE AEROSOLS
Donald L. Graham, Midland, Mich., assignor to The Dow Chemical Company, Midland, Mich., a corporation of Delaware
Continuation of abandoned application Ser. No. 184,052, Apr. 2, 1962. This application Apr. 18, 1966, Ser. No. 549,116
Int. Cl. B67b 7/24
U.S. Cl. 222—80    16 Claims

ABSTRACT OF THE DISCLOSURE

The present invention is concerned with polyurethane aerosols and relates more particularly to such devices for producing foamed polyurethanes. It pertains especially to an aerosol comprising a package containing ingredients capable of reacting when mixed to produce a polyurethane foam and means for dispensing the reaction mixture therefrom.

CROSS-REFERENCE TO RELATED APPLICATION

This is a continuation of application Ser. No. 184,052, filed Apr. 2, 1962, now abandoned.

SUMMARY OF THE INVENTION

It has now been discovered, in accordance with the present invention, that an aerosol for producing polyurethane foams can be made by providing a container with a plurality of individual compartments separated by frangible non-porous walls, which compartments contain ingredients capable of reacting and forming a polyurethane foam when mixed with one another and means for dispensing the reaction mixture therefrom.

This invention is characterized by the use of a pressurized package which performs the functions of serving as (1) a container for components necessary to form and foam a polyurethane, (2) a mixing and reacting chamber for these components, and (3) a means for dispensing the reaction mixture from package to a desired location.

The basic ingredients utilized in the preparation of a polyurethane foam are a polyol, and a polyisocyanate. In the present invention the basic ingredients are maintained separate from one another until the production of a foam is desired. The invention additionally requires a propellant and catalyst as necessary ingredients. The propellant is a normally gaseous agent, i.e. is a gas at room temperature and atmospheric pressure. Examples of suitable propellants are:

$CBrClF_2$, $CBrF_3$, $CCl_2F_2$, $C_2F_6$, $CHCl_2F$, $CHClF_2$, $CClF_2CClF_2$, $CClF_2CF_3$, $CHF_2CHF_2$, $CF_3CH_2Cl$, $(CH_3)_4C$, $\overline{CH_2CH_2CH_2}$ and $CH_3Cl$ When the polyurethane foam is desired, the components are mixed in the container, which is pressurized by the inclusion of the propellant, to form a polyurethane reaction mixture which is ejected through dispensing means such as an opened valve.

Figure 1:
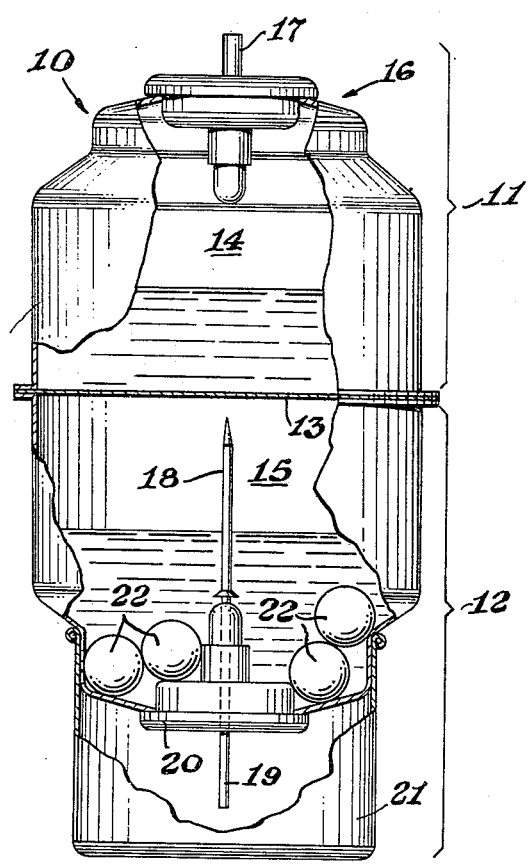

The invention is described more particularly with reference to the accompanying drawings wherein:

FIG. 1 represents a rigid container 10, comprised of two sections 11 and 12, sealed together with a frangible non-porous membrane 13, therebetween providing separate compartments 14 and 15, in the container. Section 11 contains a valve assembly 16, having a projecting valve stem 17. Section 12 is fitted with a needle-like member 18, connected to a movable plunger rod 19, protruding through a sealed fitting 20, a removable cap 21, and preferably a plurality of solid spherules 22.

In operation, one compartment, such as 15, is charged with a polyol and catalyst and the other compartment, such as 14, is charged with a polyisocyanate. An organo-silicone nucleating and dispersing agent, a blowing agent and a volatile propellant are generally added in equal amounts to both of the compartments 14 and 15, at a temperature preferably below the boiling point of the blowing agent and propellant. The two sections 11 and 12, are then sealed together with the membrane 13, separating the compartments 14 and 15, and the container is stored until needed. The foamed polyurethane is produced by removing the protective cap 21, and depressing the plunger rod 19, which forces the needle to rupture the dividing membrane 13. The container 10, is shaken for a short time causing the spherules 22, to tear the ruptured foil and facilitate mixing of the ingredients. The exposed valve stem 17, is then depressed allowing the propellant to eject the fluid contents which form a foamed polymer.

Figure 2:
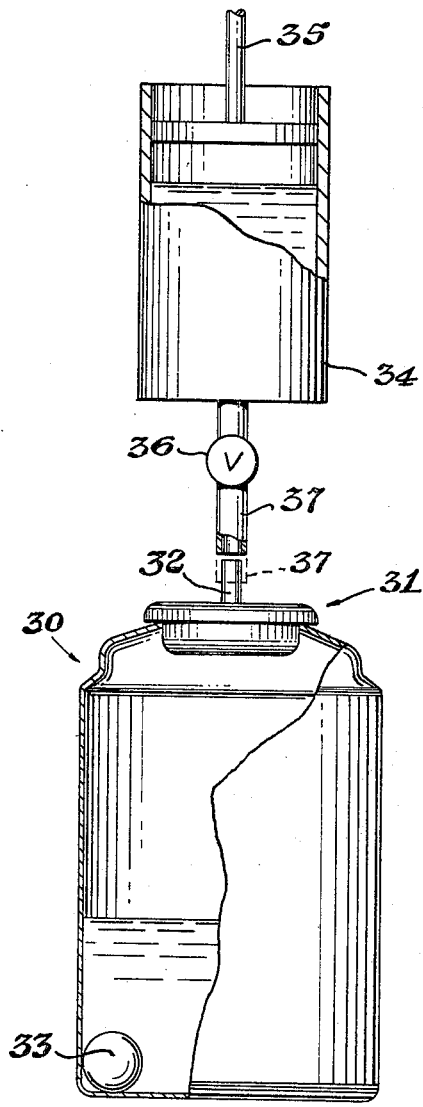

FIG. 2 represents another embodiment of the invention. A rigid container 30, is fitted with a valve assembly 31, containing a valve stem 32, and a steel ball 33. The valve assembly 31, is adapted for feeding materials into, and dispensing materials from, the container 30. In operation, the container 30 is charged with a polyisocyanate and a volatile propellant, at a temperature preferably below the boiling point of the propellant. A calibrated loading cylinder 34, having a piston 35, and a valve 36, located within a narrow open ended, sleeve-like extension 37, is employed to introduce a polyol in combination with a catalyst into the container 30. An organo-silicone nucleating and dispersing agent, and a blowing agent, if desired, are added to the polyol and/or the polyisocyanate components. After positioning the sleeve-like extension 37, tightly around the valve stem 32, a pre-determined amount of the contents of the cylinder 34, is forced by use of the piston 35, into the container 30, through the valve 36, and the valve assembly 31. The resulting contents of the container 30, are mixed by shaking, followed by ejection of the contents when the valve stem 32, is depressed.

The polyisocyanate used is preferably toluene diisocyanate although other polyisocyanates such as m-phenylene diisocyanate, methylenebis(phenyl iseocyanate), tetramethylene diisocyanate, hexamethylene diisocyanate and similar organic polyisocyanates may be suitably employed. The polyisocyanate may also be employed in the form of a prepolymer which comprises the reaction product of an excess of the polyisocyanate and a polyhydroxy ether or polyhydroxy ester prepared by the condensation reaction of an alkylene oxide with a polyhydroxy glycol.

Any of the nucleating and dispersing agents generally used in making urethane foams may be utilized. Examples of typical agents suitable are described in the bulletin "Rigid Urethane Foams—II, Chemistry and Formulation" by C. M. Barringer, HR-26, Elastomer Chemicals Dept., E. I. du Pont Company, April 1958. These agents improve the mixing of the components and influence cellular structure of the foamed polymer. The agent used in the following examples was a block copolymer of dimethyl siloxane and polyglycols.

The catalyst may include various tin compounds such as stannous octoate, stannous oleate, dibutyl tin dilaurate, metal salts such as ferric acetylacetonate, and tertiary amines such as teramethylbutanediamine, triethylenediamine, diethylethanolamine, trimethylamine and dimethylethanolamine.

It is important that the mixture contains a propellant, which is a gas under normal conditions, to eject and froth the liquid contents of the container.

A volatile blowing agent, which is a liquid under normal conditions, is preferably employed as an additional component in the method of the present invention. Since the method of the present invention utilizes mechanical means rather than chemical means for producing a foamed polyurethane, it is necessary that the blowing agent chosen is non-reactive with the other components and has a boiling point sufficiently low to allow it to rapidly expand as the temperature of the exothermic reaction mixture, ejected from the pressurized container, increases. Examples of compounds suitable for this purpose are: $CH_2Cl_2$, $CBr_2F_2$, $CCl_2FCClF_2$, $CBrF_2CBrF_2$ and $CCl_3F$.

The polyol which is to be reacted with a polyisocyanate, or a prepolymer form of the polyisocyanate, can be a polyhydroxy ether or a polyhydroxy ester prepared by the reaction of an alkylene oxide with a polyol such as sucrose or sorbitol, or a mixture of polyols such as sucrose or sorbitol with glycerol. For example, the polyol may be a polyhydroxy ether which is the condensation product of an alkylene oxide having from 2 to 4 carbon atoms and a polyhydric alcohol having less than 7 carbon atoms and having 3 to 6 primary hydroxyl groups.

In practice of the present invention, a polyhydroxy ether, prepared by the reaction of an alkylene oxide with a polyhydroxy glycol, and an organic polyisocyanate are reacted to form a prepolymer. This prepolymer in combination with isobutane and trichloromonofluoromethane is introduced into one compartment of the container of FIG. 1. A second polyhydroxy ether is prepared by the reaction of an alkylene oxide with a polyol such as sucrose or sorbitol, or a mixture of polyols, such as sucrose or sorbitol with glycerine. This polyhydroxy ether is blended with an amine catalyst, an organo-silicone nucleating and dispersing agent, trichloromonofluoromethane and isobutane and the mixture introduced into a second compartment of the container of FIG. 1. The two compartments are separated by a non-porous membrane, e.g. an 0.0075 inch aluminum foil, and the container is stored until needed. The polyurethane foam is produced when desired as detailed previously in the description of FIG. 1, above.

SPECIFIC EMBODIMENTS

The following examples describe completely representative specific embodiments of the present invention. These examples are not to be interpreted as limiting the invention other than as defined in the claims.

Example 1

(A) A polyol was prepared by the addition reaction of 7,756 grams of beet sugar, 5,216 grams of glycerol and 20,412 grams of propylene oxide. The sucrose and glycerol were placed in a reaction vessel equipped with a stirrer and reflux condenser. A quantity of 210 grams of triethylamine and 210 grams of water were added. The vessel was closed and the mixture was stirred and heated to 100° C., after which the propylene oxide was added over a 12-hour period and under a pressure of about 50 p.s.i.g. Upon completion of the propylene oxide addition, the reaction mixture was stirred for 2 hours longer at approximately 100° C. Thereafter the pressure was released. The mixture was then heated under 5 mm. absolute pressure for 15 minutes at 100° C. to remove volatile ingredients.

(B) A prepolymer was prepared by reacting 9750 g. of toluene diisocyanate and 2430 g. of 1,2,3-tris(hydroxypropyl)glycerol. The diisocyanate was placed in a reaction vessel, equipped with means for heating, temperature control and maintaining a nitrogen atmosphere, and heated to 60° C. after which the 1,2,3-tris(hydroxypropyl) glycerol was added over a 45 min. period. During this period, the temperature of the reaction vessel was maintained between 55 and 60° C.

(C) A quantity of 47 g. of the product prepared in part (A) was blended with 8.05 g. of trichloromonofluoromethane, 0.2695 g. of an organosilicone nucleating and dispersing agent, 0.2695 g. of triethylenediamine and 10.5 cc. of isobutane. This mixture was introduced into one compartment of the container of FIG. 1.

(D) A quantity of 61 g. of the product prepared in part (B) was blended with 8.05 g. of trichloromonofluoromethane and 10.5 cc. of isobutane. This mixture was introduced into a second compartment of the container of FIG. 1. The two compartments were then sealed together with an 0.0075 inch aluminum foil separating the two compartments and the container stored for later use. At a subsequent time the protective cap was removed and the plunger was depressed causing the needle-like extension to rupture the aluminum foil. After immediately shaking the container for about 20 to 40 seconds, the valve stem was depressed and the isobutane rapidly ejected and frothed the container's liquid contents. Subsequent, the trichloromonofluoromethane blowing agent, vaporized by the increasing temperature of the exothermic reaction, foamed the polyurethane to a final product having a very fine cellular structure, a cured foam density of approximately 2.3 lbs./ft.$^3$ and a closed cell content of approximately 88 percent.

Example 2

A quantity of 61 grams of prepolymer prepared as in Example 1(B) was placed in a container similar to FIG. 2, together with 20.7 cc. of isobutane and a one-half inch diameter steel ball. Subsequently, 63.4 grams of polyol, prepared as in Example 1(A) were mixed with 16.1 grams of trichloromonofluoromethane, 0.2695 gram of an organo-silicone nucleating and dispersing agent and 0.2695 g. of triethylenediamine and the mixture introduced into the container by means of the cylinder arrangement of FIG. 2 described previously. The container was immediately shaken for 20 to 40 seconds and the contents ejected by depressing the valve stem. The resulting polyurethane foam was similar to that of Example 1.

I claim:
1. A package for making a polyurethane foam comprising a closed container having:
   (1) side walls and two end walls, said side walls being formed from an upper and a lower section fastened together by flanges around the periphery of both said lower section and said upper section,
   (2) a frangible, non-porous diaphragm fastened between said flanges and dividing said container into an upper compartment and a lower compartment, said upper compartment containing an organic polyisocyanate and a volatile propellant, and said lower compartment containing a polyhydroxy ether, a catalyst, and a volatile propellant,
   (3) a valve for discharging material from said closed container in one end wall, and
   (4) a member, which is separate and distinct from said valve, for rupturing said diaphragm, said member extending into one of said compartments and being operatively connected to a plunger rod, said plunger rod being slidably mounted through the other end wall of said container in a sealed fitting.

2. The package of claim 1 additionally comprising at least one spherule for further rupturing the diaphragm and mixing the ingredients.

3. The package of claim 1 wherein the polyhydroxy ether is the condensation product of an alkylene oxide having from 2 to 4 carbon atoms and a polyhydric alcohol having less than 7 carbon atoms and having 3 to 6 primary hydroxyl groups.

4. The package of claim 1 wherein the catalyst is a tertiary amine.

5. The package of claim 1 wherein the polyisocyanate is toluene diisocyanate.

6. The package of claim 1 wherein the propellant is isobutane.

7. The package of claim 1 wherein the trichloromonofluoromethane is additionally employed as a blowing agent by incorporation with said ingredients.

8. A package for making a polyurethane foam comprising a first closed container and a second closed container, said first closed container having:
   (1) means for receiving a charge of material entering said first closed container and for discharging material therefrom; and
   (2) means for joining said first closed container and second closed container through which material may enter said first closed container from said second closed container, said first closed container containing an organic polyisocyanate and a volatile propellant; and said second closed container comprising a cylinder having:
   (1) a piston slidably mounted within said cylinder at one end,
   (2) a discharge valve located in the opposing end of said cylinder, and
   (3) means connected to said discharge valve for joining said second closed container to said first closed container, said second closed container containing a measured amount of a polyhydroxy ether in combination with a catalyst.

9. The package of claim 8 wherein the means on said first closed container adapted to receive a charge of material entering said first closed container and to discharge material therefrom is a two-directional valve.

10. The package of claim 8 wherein the means on said first closed container adapted to receive a charge of material entering said first closed container and to discharge material therefrom is a two-directional valve, the means on said first closed container for joining said first closed container and said second closed container is a valve stem extending from the two-directional valve, and the means connected to the discharge valve of said second closed container for joining said second closed container and said first closed container is a sleeve-like extension adapted to engage the valve stem extending from the valve of said first closed container.

11. The package of claim 8 additionally comprising at least one spherule in said first container for mixing the contens of said first container.

12. The package of claim 8 wherein the polyhydroxy ether is the condensation product of an alkylene oxide having from 2 to 4 carbon atoms and a polyhydric alcohol having less than 7 carbon atoms and having 3 to 6 primary hydroxyl groups.

13. The package of claim 8 wherein the catalyst is a tertiary amine.

14. The package of claim 8 wherein the polyisocyanate is toluene diisocyanate.

15. The package of claim 8 wherein the propellant is isobutane.

16. The package of claim 8 wherein trichloromonofluoromethane is additionally employed as a blowing agent by incorporation with said ingredients.

References Cited

UNITED STATES PATENTS

| | | | |
|---|---|---|---|
| 3,059,253 | 10/1962 | Sager | 9—8 |
| 3,072,582 | 1/1963 | Frost | 260—2.5 |
| 3,080,094 | 3/1963 | Modderno | 222—82 |
| 3,096,001 | 7/1963 | Boe et al. | 222—135 |
| 3,119,528 | 1/1964 | Dunning | 222—82 |
| 3,172,568 | 3/1965 | Modderno | 222—80 |
| 3,181,737 | 5/1965 | Chaucer | 222—136 |
| 3,240,396 | 3/1966 | Friedberg | 222—182 |
| 3,343,718 | 9/1967 | Siegel et al. | 222—1 |

DONALD E. CZAJA, Primary Examiner

MICHAEL B. FEIN, Assistant Examiner

U.S. Cl. X. R.

222—190; 260—2.5